(12) United States Patent
Kalia et al.

(10) Patent No.: US 11,188,447 B2
(45) Date of Patent: Nov. 30, 2021

(54) DISCOVERY OF COMPUTER CODE ACTIONS AND PARAMETERS

(71) Applicant: International Business Machines Corporation, Armonk, NY (US)

(72) Inventors: Anup Kalia, Elmsford, NY (US); Muhammed Fatih Bulut, New York, NY (US); Jinho Hwang, Ossining, NY (US); Raghav Batta, Ossining, NY (US); Maja Vukovic, New York, NY (US); Jin Xiao, Ossining, NY (US); Rohit Madhukar Khandekar, Jersey City, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/294,516

(22) Filed: Mar. 6, 2019

(65) Prior Publication Data
US 2020/0285558 A1    Sep. 10, 2020

(51) Int. Cl.
*G06F 11/36* (2006.01)
*G06F 8/10* (2018.01)
(Continued)

(52) U.S. Cl.
CPC ............ *G06F 11/3604* (2013.01); *G06F 8/10* (2013.01); *G06F 40/211* (2020.01); *G06K 9/6215* (2013.01); *G06K 9/6218* (2013.01)

(58) Field of Classification Search
None
See application file for complete search history.

(56) References Cited

U.S. PATENT DOCUMENTS 8,713,146 B2 * 4/2014 Pedersen ............... G06Q 10/06
709/223
2002/0169764 A1 * 11/2002 Kincaid ............... G06F 16/951
(Continued)

OTHER PUBLICATIONS

Gilbert, "Knowledge Discovery with Clustering Based on Rules. Interpreting Results", 1998, European Symposium on Principles of Data Mining and Knowledge Disco (Year: 1998).*

(Continued)

*Primary Examiner* — Hossain M Morshed
(74) *Attorney, Agent, or Firm* — Amin, Turocy & Watson, LLP

(57) ABSTRACT

Systems, computer-implemented methods, and computer program products that can facilitate creating and querying a knowledge base of identified topics, computer code actions, and parameters, are provided. According to an embodiment, a system can comprise a memory that stores computer executable components and a processor that executes the computer executable components stored in the memory. The computer executable components can comprise a parameter component that can identify a result parameter in ones of one or more results, wherein the one or more results comprise topics and computer code actions. The computer executable components can further comprise a result component that can select a result of the one or more results based on a mapping of a query to the one or more results, the mapping being based on the result parameter identified in the result and a criterion.

20 Claims, 11 Drawing Sheets

(51) Int. Cl.
G06K 9/62 (2006.01)
G06F 40/211 (2020.01)

(56) References Cited

U.S. PATENT DOCUMENTS

| | | | |
|---|---|---|---|
| 2006/0190579 A1* | 8/2006 | Rachniowski | H04L 41/0843 709/223 |
| 2007/0094541 A1* | 4/2007 | Kang | G06F 11/3688 714/38.1 |
| 2009/0265346 A1* | 10/2009 | Kadayam | G06F 16/951 |
| 2010/0042560 A1* | 2/2010 | Vukovic | G06N 5/022 706/12 |
| 2012/0016713 A1* | 1/2012 | Wilcock | G06F 9/5038 705/7.27 |
| 2012/0158791 A1* | 6/2012 | Kasneci | G06F 16/9024 707/798 |
| 2012/0185489 A1* | 7/2012 | Shah | G06Q 30/06 707/749 |
| 2017/0199917 A1* | 7/2017 | Ekambaram | G06F 16/248 |
| 2017/0242886 A1* | 8/2017 | Jolley | G06F 40/205 |
| 2017/0249311 A1* | 8/2017 | Pelleg | G06N 5/04 |
| 2017/0293874 A1* | 10/2017 | Asaf | G06N 3/0436 |
| 2019/0065576 A1* | 2/2019 | Peng | G06F 16/22 |
| 2019/0244225 A1* | 8/2019 | Ravichandran | G10L 15/22 |

OTHER PUBLICATIONS

TechTerms, "Query", 2020, https://techterms.com/definition/query#:~:text=Query%20is%20another%20word%20for%20question.&text=For%20example%2C%20if%20you%20need,program%20rather%20than%20a%20person. (Year: 2020).*

Anonymous, "Mechanism To Utilize Text Analysis To Determine Weighted Sentiment Analysis Based On Author's Influence Factor", 2012, IP.com (Year: 2012).*

Yang, "From Query to Usable Code: An Analysis of Stack Overflow Code Snippets", 2016, IEEE/ACM 13th Working Conference on Mining Software Repositories (Year: 2016).*

Gilbert, "Knowledge Discovery with Clustering Based on Rules. Interpreting Results", 2006, Communications Session 4. Clustering and Discretization (Year: 2006).*

Yang, "From Query to Usable Code: An Analysis of Stack Overflow Code Snippets", 2016, IEEE/ACM (Year: 2016).*

Annonymous, "Mechanism To Utilize Text Analysis To Determine Weighted Sentiment Analysis Based On Author's Influence Factor", 2012, IP.com (Year: 2012).*

Moise, Daniel L., et al. "Reverse Engineering Scripting Language Extensions," 14th IEEE International Conference on Program Comprehension (ICPC'06), Athens, 2006, pp. 295-306. 10 pages.

Ponzanelli, Luca, et al. "Mining StackOverflow to Turn the IDE into a Self-Confident Programming Prompter." Proceedings of the 11th Working Conference on Mining Software Repositories (MSR 2014). ACM, New York, NY, USA, 102-111. 10 pages.

Yang, Di, et al. "From Query to Usable Code: An Analysis of Stack Overflow Code Snippets." Proceedings of the 13th International Conference on Mining Software Repositories (MSR '16). ACM, New York, NY, USA, 391-402. 11 pages.

"linux.org." https://www.linux.org/docs/man1/mysql.html. Last Accessed Jan. 15, 2019. 6 pages.

"Sed, a stream editor." GNU Operating System. https://www.gnu.org/software/sed/manual/sed.html#Introduction. Last Accessed Jan. 15, 2019. 101 pages.

"Percona Toolkit." Percona. https://www.percona.com/doc/percona-toolkit/LATEST/pt-show-grants.html. Last Accessed Jan. 15, 2019. 13 pages.

"MySQL Servier." MySQL. https://dev.mysql.eom/doc/refman/8.0/en/show-grants.html. Last Accessed Jan. 15, 2019. 4 pages.

Kalia, Anup K., et al. "Cataloger: Catalog Recommendation Service for IT Change Requests." Service-Oriented Computing: 15th International Conference, ICSOC 2017, Malaga, Spain, Nov. 13-16, 2017, Proceedings (pp. 545-560). 15 pages.

Yin, Pengcheng, et al. "Learning to Mine Aligned Code and Natural Language Pairs from Stack Overflow." MSR 2018, May 28-29, 2018, Gothenburg, Sweden. 11 pages.

Lin, Xi Victoria, et al. "NL2Bash: A Corpus and Semantic Parser for Natural Language Interface to the Linux Operating System." arXiv:1802.08979. 2018. 12 pages.

"Stackoverflow.'" stackoverflow.com. Last Accessed Jan. 15, 2019. 57 pages.

"Serverfault." serverfault.com. Last Accessed Jan. 15, 2019. 8 pages.

Yao, Ziyu, et al. "StaQC: A Systematically Mined Question-Code Dataset from Stack Overflow." arXiv:1803.09371v1 [cs.CL] Mar. 26, 2018. 11 pages.

* cited by examiner

200→

205→
Question: Export privileges from MySQL and import to a new server
I know how to export/import a database using mysqldump, but how do I get user privileges configured on the new server?
206→ Old server: 5.0.5
New server: 5.0.6

210→ Answer
╔═══════════════════════════════════════════════════════════════════════════════╗
215→ There are two methods for solving this problem:

220A→ METHOD #1
224A→ You can use grants-show from Gamma Toolkit
225A→      grants-show ${DATAB_CONNECT N}> GRANTS_USER.DAT 220B→ METHOD #2
224B→ The equivalent of grants-show can be achieved with:
225B→      display-val > GRANTS_USER.DAT 230→
231→ Either way, you can get an output of the database permission grants. This can be put into a script for your new server.
232→      script -go
240→ I've tried both and like the second approach better.
╚═══════════════════════════════════════════════════════════════════════════════╝

FIG. 2

```
{
  "topics":{
    "OS ALPHA": {
      "COMMAND A": {
        "parameters":["-B","-N","-r","-e","--user","--password","--host","grep","sed", "pt-show-grants ", "--skip-column-names"],
        "references":["https://www.linux.org/docs/man1/mysql.html",
                      "https://www.gnu.org/software/sed/manual/sed.html#Introduction",
                      "https://www.percona.com/doc/percona-toolkit/LATEST/pt-show-grants.html"]
      }
    },
    "APPLICATION B": {
      "SHOW GRANTS":{
        "parameters": ["user","host"],
        "references": [" https://dev.mysql.com/doc/refman/8.0/en/show-grants.html"]
      }
    }
  }
}
```

FIG. 7

DISCOVERY OF COMPUTER CODE ACTIONS AND PARAMETERS

BACKGROUND

The subject disclosure relates to computer code, and more specifically, to discovery and validation of computer code resources.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, or computer program products that can facilitate discovery of computer code actions and parameters.

According to an embodiment, a system can comprise a memory that stores computer executable components, and a processor that executes the computer executable components stored in the memory. The computer executable components can comprise a parameter component that can identify a result parameter in ones of one or more results, wherein the one or more results can comprise topics and computer code actions. The computer executable components can also comprise a result component that selects a result of the one or more results based on a mapping of a query to the one or more results, the mapping being based on the result parameter identified in the result and a criterion.

According to another embodiment, a computer-implemented method can comprise identifying, by a system operatively connected to a processor, a result parameter in ones of one or more results, wherein the one or more results comprise topics and computer code actions. The computer-implemented method can also comprise selecting, by the system, a result of the one or more results based on a mapping of a query to the one or more results, the mapping being based on the result parameter identified in the result and a criterion.

According to another embodiment, a computer program product that can facilitate creating and querying a knowledge base of identified topics, computer code actions, and parameters. The computer program product can comprise a computer readable storage medium having program instructions embodied therewith, the program instructions can be executable by a processor to cause the processor to identify a result parameter in ones of one or more results, wherein the one or more results comprise topics and computer code actions. The instructions can further cause the processor to select a result of the one or more results based on a mapping of a query to the one or more results, the mapping being based on the result parameter identified in the result and a criterion.

BRIEF DESCRIPTION OF THE DRAWINGS

FIG. 2 illustrates an example of a user interface of a data source analyzed by one or more embodiments.

FIG. 7 illustrates sample topic labels and identified results integrated into computer code with references to identified documentation, in accordance with one or more embodiments.

DETAILED DESCRIPTION

The following detailed description is merely illustrative and is not intended to limit embodiments, application, or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Figure 1:
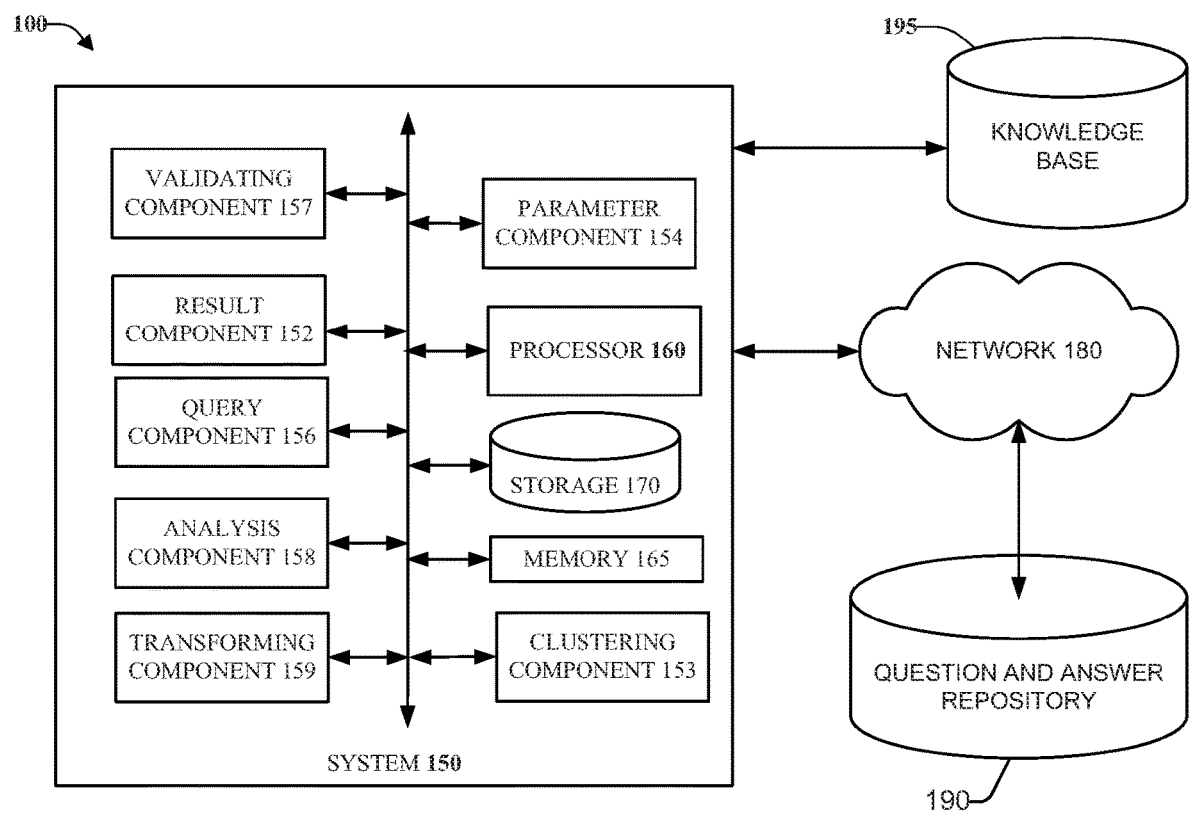
FIG. 1 illustrates a block diagram of an example, non-limiting system that can facilitate creating and querying a knowledge base of identified topics, computer code actions, and parameters, in accordance with one or more embodiments described herein.

FIG. 1 illustrates a block diagram of an example 100 of a non-limiting system 150 that can facilitate creating and querying a knowledge base 195 of identified topics, computer code actions, and parameters, in accordance with one or more embodiments described herein. In one or more embodiments, knowledge base 195 can be a data structure created and updated based on analysis and processing of documents stored in question and answer repository 190. Question and answer repository 190 is a non-limiting example of a data source, accessible by system 150 by employing network 180, that can be analyzed and processed in accordance with one or more embodiments. For example, in question and answer repository 190, the questions can be inquiries related to computer-related tasks, and the answers can provide one or more solutions to the questions. The solutions can include narrative instructions that describe how a solution can by implemented, as well as computer code actions with parameters that can implement the solutions in different contexts. As described herein, one or more embodiments can use different approaches to analyze, evaluate, and organize data from question and answer repository 190 into searchable knowledge base 195.

In one or more embodiments, question and answer repository 190 can have documents from a variety of different subjects, e.g., general computer-related questions and answers. In other embodiments, question and answer repository 190 can have documents limited to those from one or more domain-specific topics. In one or more embodiments, the domain-specific topics are specific to computing areas in a particular domain e.g., database, operating system, application, storage application, computer hardware, and other similar computer-oriented domains.

Example questions in the database domain-specific topic can include: how to restart a database; how to change a database; how to change a table space; and how to create a table. It should be noted that documents can be in a domain-specific topic based the content of a question, an answer or other parts of documents discussed below, e.g., feedback and comments. Thus, a document with a question that asks how to change a database in a particular database system can be in a domain-specific topic with an answer to a question that describes how to create a database table in a different database application. As noted above, one or more embodiments can start with documents of a domain-specific topic and also, as discussed below, can generate, and label with, domain-specific topics from the analysis of document data.

Example questions in the operating system domain-specific topic can include: how to decommission a server, how to restart a server, and how to change a file system. It should be noted that the type of questions in this example are similar to those noted above with the database domain-specific topic, e.g., creating, modifying and modifying program components. Example questions in the middleware domain-specific topic can include: how to start a middleware system, how to stop a middleware system. Example questions in the storage domain-specific topic can include: how to change a disk, how to mount a disk, how to unmount a disk. The security domain-specific topic questions can include, for example: how to grant access rights to a user, how to revoke access rights from a user.

It should be noted that one or more embodiments can work with topics of a variety of scopes, e.g., instead of domain-specific topics that include broad categories of computer applications, one or more embodiments can have domain-specific topics that focus on types of commands, across multiple application types. For example, example questions in managing processes domain-specific topic can include: starting a database, starting a firewall, stopping a logging process, and starting a web server.

As discussed further with FIG. 4 below, the computer-related topics noted above can facilitate the application of topic labels to documents analyzed by one or more embodiments.

According to multiple embodiments, memory 165 can store one or more computer or machine readable, writable, or executable components or instructions that, when executed by processor 160, can facilitate performance of operations defined by the executable component(s) or instruction(s). For example, memory 165 can store computer or machine readable, writable, or executable components or instructions that, when executed by processor 160, can facilitate execution of the various functions described herein relating to system 150, including, as discussed further below, parameter component 154, result component 152, query component 156, validating component 157, analysis component 158, and transforming component 159. Example operations that can be performed by computer executable components of system 150 are described with reference to the example architectures shown in FIGS. 4 and 6 below.

In some embodiments, memory 165 can comprise volatile memory (e.g., random access memory (RAM), static RAM (SRAM), dynamic RAM (DRAM), etc.) or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1116 and FIG. 11. Such examples of memory 165 can be employed to implement any embodiments of the subject disclosure.

According to multiple embodiments, processor 160 can comprise one or more types of processors or electronic circuitry that can implement one or more computer or machine readable, writable, or executable components or instructions that can be stored on memory 165. For example, processor 160 can perform various operations that can be specified by such computer or machine readable, writable, or executable components or instructions including, but not limited to, logic, control, input/output (I/O), arithmetic, or the like. In some embodiments, processor 160 can comprise one or more central processing unit, multi-core processor, microprocessor, dual microprocessors, microcontroller, System on a Chip (SOC), array processor, vector processor, or another type of processor. Further examples of processor 160 are described below with reference to processing unit 1114 and FIG. 11. Such examples of processor 160 can be employed to implement any embodiments of the subject disclosure.

Figure 3:
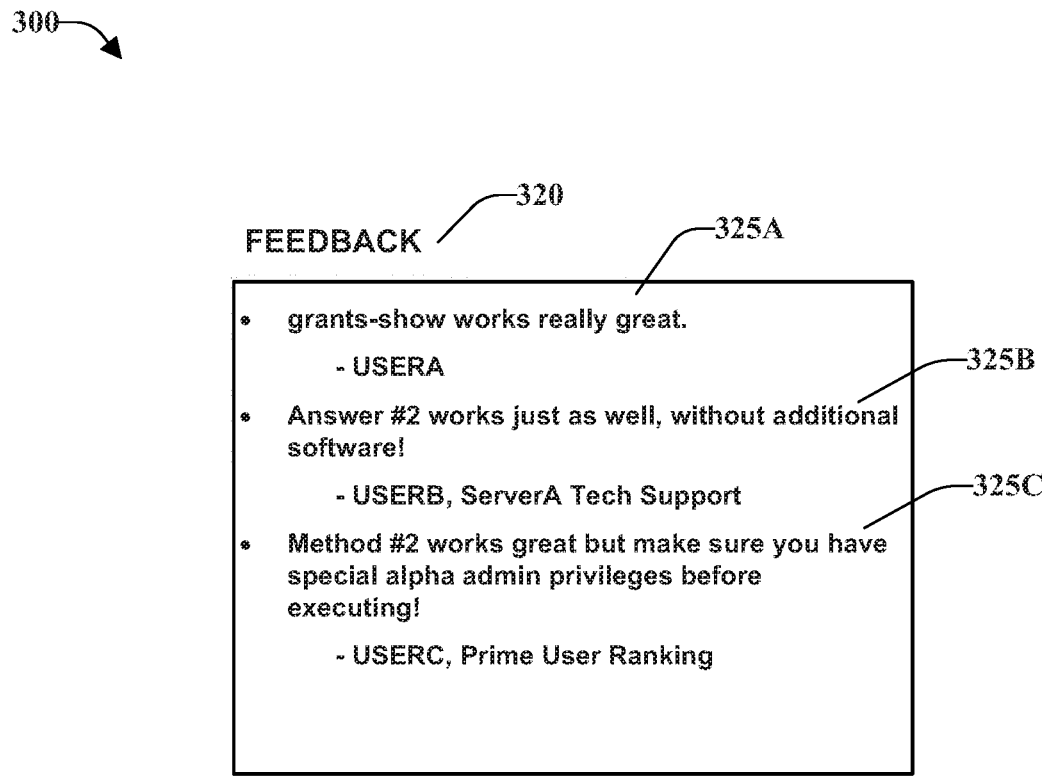
FIG. 3 illustrates an example of feedback in a user interface of a data source analyzed by one or more embodiments.

FIGS. 2-3 respectively show parts of a user interface from an example repository that can be analyzed and evaluated, by one or more embodiments, to generate knowledge base, e.g., question and answer repository 190 being analyzed and evaluated to generate knowledge base 195. Repetitive description of like elements or processes employed in embodiments is omitted for sake of brevity.

In this example, question and answer repository 190 is a public forum accessible using a network, that can allow the posting of computer-related questions and answers, e.g., a question that requests instructions to solve a problem, and answers that include explanations and solutions to solve the problems. In a specific example of this type of system, question and answer repository 190 can be a system to handle change tickets or service tickets, such tickets created, for example, when an information technology (IT) organization receives a request to fix a computer problem, along with a record the actions taken. Although this non-limiting example is used herein to describe aspects of one or more embodiments, other types of data repositories can be used by one or more embodiments as described herein.

It should be noted that, one or more embodiments discussed herein describe the use of a computer code action. It is important to note that computer code action is broadly used herein to include all types of computer code that can cause actions by computer, e.g., operating system commands, source code that is compiled for use, program object notation, and other similar approaches to controlling a computer. Computer code actions can also include commands specific to applications, e.g., web servers, databases, middleware, security layers, and other types of applications. Further, computer code actions can include combinations of commands in a scripting language, e.g., automation scripts such as Python, UNIX Shell script, Bash, etc. Automation scripts can provide very useful collections of commands, with variables and customizations for different contexts. Described further below, one or more embodiments can not only facilitate the discovery of code for particular topics, but can also provide standardization of code, as well as appropriate environment and context details.

It should also be noted that computer code actions can include one or more parameters that can provide an input for the action. Example parameters can include the name of a service for an operating system command to start a service, and the name of a database for a database command to index a database. Parameters can also include flags, e.g., indicators to modify the command to operate in a particular way. An example flag can modify the operation of an operating system list (1s) command, e.g., in 1s −1, the −1 is a flag that displays a long version of files in a directory. As described throughout this disclosure, one or more embodiments described herein can facilitate the discovery of parameters that can be stored for querying, e.g., in knowledge base 195. One or more embodiments, by locating and providing customized computer code with parameters, can provide opportunities for automating solutions to problems, e.g., facilitating discovery of code that, in some circumstances, can be used without substantial modification. Examples that highlight relationships between computer code actions and parameters are provided with the discussion of FIGS. 2, 4, and 5-7 below.

The example data discussed below is depicted in example record 200, including question 205 and answer 210. In this example, answer 210 includes methods 220A-B, each having a solution to question 205 that includes respectively, a narrative explanation 224A-B and a computer code action 225A-B. In this non-limiting example, only one answer 210 is depicted, but in other embodiments many different answers 210 can be included within record 200.

Example question 205 includes a description of the question to be answered, as well as context 206. In this example, question 205 relates to exporting privileges from one database to another database, and context 206 provides the versions of the old and new databases. As discussed further below with the description of FIG. 4, one or more embodiments can use this context 206 to determine the uses of the details provided in answer 210, e.g., the contexts where computer code actions 225A-B can be executed, e.g., commands are requested to export privileges from database server version 5.0.5 to a new database server 5.0.6.

It should be noted that, in one or more embodiments, context 206 is not identified as such in the data, rather, embodiments can use machine learning analysis of record 200 to identify the database version notes in question 205 as a context for executing the computer code actions 225A-B of answer 210. A detailed discussion of some machine learning approaches that can be used by one or more embodiments to identify different contexts is included with the discussion of FIGS. 4 and 8 below.

Another context included in record 200 can include post-condition 230, e.g., with post-condition narrative description 231 and post-condition program code 232. In one or more embodiments, post-condition narrative description 231 describes conditions that can exist after execution of one or both of response computer code actions 225A-B, with narrative description 231 describing the post-condition and post-condition program code 232 being code that can be executed to further the instructions of answer 210. One or more embodiments can parse answer 210 and identify narrative description 231 and post-condition program code 232 from the collection of text in answer 210. As discussed further below, one parsing technique can use syntactic analysis to identify the structure of answer 210, and label topics, computer command actions, and other element of analyzed documents. These examples of contexts are non-limiting, and additional examples of contexts used by embodiments are discussed below, e.g., with the description of FIG. 4.

Answer 210 can also include comment 240 as additional data related to answer 210. For example, comment 240 describes a use of both method #1 220A and method #2 220B, and a comparison of the efficacy of both methods, e.g., method #2 220B is preferred as a solution. As discussed with FIGS. 3, 6, and 8 below, to provide results, one or more embodiments can assess the sentiment of comments and select a solution based on the sentiment, e.g., method #2 220B can be selected based on positive sentiment detected in comment 240, e.g.: "I've tried both and like the second approach better." As discussed with FIG. 3 below, feedback 320 can provide feedback added to user interface record 200 by other sources to provide additional data about answer 210, e.g., information as to the efficacy of one or more parts of answer 210.

FIG. 3 continues the description of sample data discussed above, with a display of feedback 320 associated with question 205 described with FIG. 2 above. As depicted, answer 210 analyzed by one or more embodiments can have associated feedback 320 about the questions and the answers, e.g., additional details added in response to questions and answers, that can rate the efficacy of the answers. Similar to comment 240 noted above, feedback 320 can provide additional data about answer 210. In contrast to comment 240, in one or more embodiments, feedback 320 can come from a different source than answer 210, that is, feedback 320 can provide an evaluation of answer 210 from an independent source, and thus potentially provide a more accurate assessment of answer 210.

In one or more embodiments, feedback 320 can include one or more notes of feedback 325A-B of feedback regarding the efficacy of answer 210 approaches discussed above. For example, feedback 325A references method #1 220A from answer 210, stating that it works well, and feedback 325B references method #2 220B, stating that it works as well as method #1 220A, but without requiring additional software. As described above, in one or more embodiments, feedback 320 can be provided by independent sources, after an evaluation of answer 210.

Using some approaches described herein, one or more embodiments can determine that feedback 325C can provide additional technical information associated with question 205 and answer 210. Based, for example, on the suggestion to have special privileges before performing particular steps, feedback 325C can be analyzed similar to answer 210 discussed above, e.g., the suggestion to secure particular administrative rights can be determined to be a pre-condition to a solution, as described further with FIG. 4 below.

Additionally, like comment 240 discussed above, notes of feedback 325A-B of feedback can be evaluated for sentiment, and the efficacy of one or more parts of answer 210 can be assessed based on these sentiments, e.g., feedback 325A has sentiment that positively evaluates both method #1 220A and method #2 220B and feedback 325B has sentiment that adds additional positive sentiment for method #2 220B and an additional benefit of method #2 220B.

Further, in one or more embodiments, the technical information and results of sentiment analysis discussed above can be weighted by different factors that can provide indications of the value of the feedback. For example, one or more embodiments can have weights assigned to the source of feedback, e.g., particular usernames or organizations associated with the feedback. For example, in FIG. 3, the respective notes of feedback 325A-C are posted by USERA, USERB, and USERC. In an example, USERA, as a regular user can have a normal weight assigned to the 325A feedback, while USERC, having a Prime User Ranking can have a weight automatically assigned that is greater than USERA. Continuing this example, USERB can be identified by one or more embodiments as being from an authoritative source, ServerA Tech Support, and thus the information and sentiment determined from feedback 325B can be weighted higher than USERA and USERC.

Additionally, one or more embodiments can use processes described herein, including topic identification, clustering, ranking, and feedback evaluation, to generate recommendations for results stored within the system. For example, when results associated with question 205 are stored in a knowledge base, based on factors including sentiment analysis of feedback 325C and comments 240, and topic details, the stored results can include recommendations generated by one or more embodiments, e.g., method #2 220B can be recommended. Processing and storage of results are described further with FIGS. 4-8 below.

Figure 4:
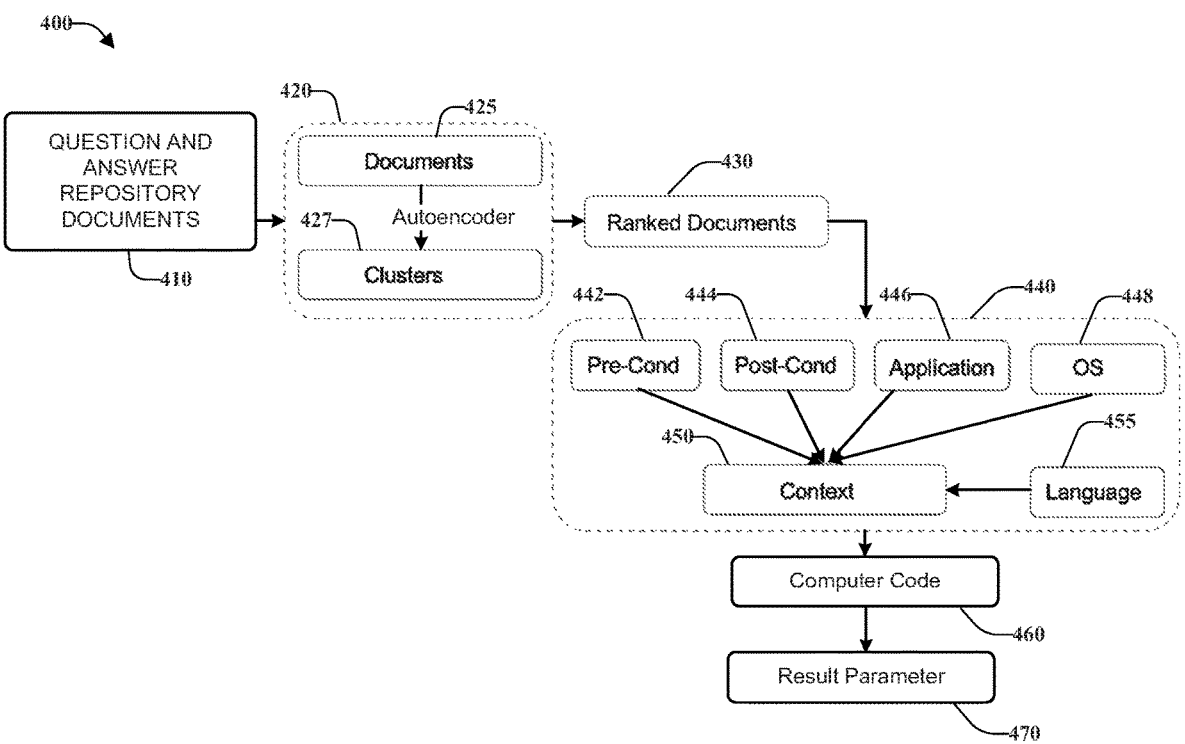
FIG. 4 illustrates an architecture diagram of a system that can facilitate creating and querying a knowledge base of identified topics, computer code actions, and parameters, in accordance with one or more embodiments.

FIG. 4 illustrates an architecture diagram of a system 400 that can facilitate creating and querying a knowledge base of identified topics, computer code actions, and parameters, in accordance with one or more embodiments. Repetitive description of like elements or processes employed in respective embodiments is omitted for sake of brevity.

In an example, FIG. 4 includes question and answer repository documents 410, e.g., documents from the example question and answer repository 190 discussed above, that can be used by one or more embodiments. As shown, autoencoder 420 can process documents 425 for further analysis. As discussed further below, example processing of documents that can be performed by autoencoder 420 include applying topic labels based on identified subjects, activities, concepts, computer code actions, and parameters identified in documents.

For example, an analyzed document can include a question that asks how to add a user to a database application. Topic labeling can identify application-level topics in this question, e.g., the topic of databases generally, as well as the topic of a particular database product. Topic labeling can also identify command-level topics in this question, e.g., topics for administration and security commands generally, as well as topics for particular functions performed by identified commands, e.g., a topic for adding users to a system and configuring permissions. Command-level topics identified in documents can also include the specific computer code actions and associated parameters, e.g., the adduser command and the -ADMIN and -NONADMIN sample parameters for adding an administrative and non-administrative user, respectively. In one or more embodiments, topic identification as described above can be performed by analysis component 158 shown in FIG. 1 above.

Topic labeling in one or more embodiments, as described above, can use a variety of approaches, from basic keyword analysis to complex topic labeling approaches such as latent Dirichlet allocation and non-negative matrix factorization, as well as deep learning approaches such as K-means analysis. Frequency based approaches, such as analyzing the frequency of verbs and nouns in documents, can also be used by one or more embodiments. For example, a document analyzed can include a high frequency of certain domain specific nouns and verbs, e.g., database, record, field, index, and rollback. Domain specific terms can be identified by one or more embodiments using semantic indexes associated with different domains, e.g., a latent semantic index can not only analyze based on the meaning of words, but also to the relationships of words to broader concepts. Based on word frequency and a semantic index, because the example terms relate to computer database applications, one or more embodiments can label the above example document with at least the database topic label.

Other topics that can be used include those related to computer code actions, e.g., computer code actions 225A-B discussed with answer 210 above. For example, if a document contains a higher frequency of terms associated with the action of exporting privileges in a database, action topics can be identified that include the basic action, e.g., exporting privileges, as well as context, e.g., a computer database application.

As discussed further below, topic-labels applied to documents can facilitate the aggregation of documents of a domain, e.g., by clustering approaches described below. In one or more embodiments, the clustering of documents can facilitate the mapping of different identified parts of a document to related parts of the document, e.g., questions labeled with one topic label mapped to answers with related topic labels. Additionally, by assigning identified topics to many documents, identified parts from one document can be mapped to one or more parts of other documents, e.g., question 205 can be mapped to other answers in other documents with topic labels in common with question 205.

In one or more embodiments, topic labels of questions and answers can facilitate the clustering of questions and answers into clusters 427 by, for example, a supervised learning/classification approach that can check common topics. In other embodiments, answer 210, feedback 320, computer code actions and parameters can be used to cluster documents 425 by mapping questions and answers. For example, in an example where instead of being included in the same answer 210, method #1 220A and method #2 220B are included in separate answers to similar questions, one or more embodiments can, by topic matching, map the similar questions and the methods 220A-B into a cluster around this collection of topics. As noted above, this approach can be applied across documents. For example, when a question in one document is determined to be related to an answer from another document, these can be clustered into a cluster 427 relating to the topics identified therein. In one or more embodiments, clustering of documents by employing autoencoder 420 as described below can be performed by clustering component 153 shown in FIG. 1 above.

At block 430, in one or more embodiments, the mapped questions and answers and the topic labeled documents can be ranked according to different factors, including a determined probability of a document having a complete answer to a particular question topic. Because this ranking can be based on a combination of topics, this action can determine the most relevant documents for particular combination of topics.

For example, returning to the database topic document above, because, for example, the document was labeled with topics that include exporting privilege actions, as well as database topic labels, this document can be ranked higher for being an answer to a question of how to export database privileges, e.g., be a more relevant document for this computer code action. Further use, by one or more embodiments, of document ranks is discussed with the description of FIG. 6 below.

At block 440, based on an analysis of identified information in a particular record, a context of a computer code action can be determined by one or more embodiments. As used herein, the context of a question can be broadly defined as information the can be relevant for answering the question with a computer code action, and the context of an answer can be broadly defined as information the can be relevant for using an answer to perform an action requested by a question. For example, as noted with the discussion of FIG. 2 above, question 205 can include context 206 information that can provide, for question 205, versions of old and new databases relevant to the question of how to export privileges from one database to another. As discussed further below, one or more embodiments can use this context 206 to determine the contexts where computer code actions 225A-B can be executed to solve the problem presented by question 205, e.g., commands are requested to export privileges from database server version 5.0.5 to a new database server 5.0.6.

Example information that can be used to determine additional types of context can include operating system 448, application 446, and language 455. In one or more embodiments, the language 455 of a computer code action can be a determined context, e.g., a database application command, a command in a scripting language, a collection of hardware configuration elements, etc.

The example contexts 450 described above and identified by one or more embodiments can affect the performance of computer code actions and associated parameters. Additional contexts 450 that can be identified by one or more embodiments include pre-condition 442, post-condition 444, an attempted solution to a problem, actions performed, and feedback from documents.

In one or more embodiments, a pre-condition 442 for an answer can be a condition that must occur to set an environment for use of a particular computer code action. For example, feedback 325C in FIG. 3 is an example of an identified pre-condition 442 for the implementation of one approach of answer 210, e.g., "Method #2 220B works great but make sure you have special alpha admin privileges before executing!" In this feedback 325C, having alpha admin privileges is specified as required in order to use computer code action 225B. This pre-condition 442 can be identified by one or more embodiments and added to the context 450 of answer 210 in knowledge base 195. Example pre-conditions for questions and attempted solutions are discussed with other examples of context identification discussed in the description of FIG. 5 below.

A post-condition 444 for an answer can be a condition that occurs after a computer code action in the answer is performed, e.g., as a solution to a question 205 in an answer 210. For example, in answer 210, post-condition narrative description 231 states: "all there is left to do is to execute the script on a new server." One or more embodiments can identify this as a post-condition 444 and identify both methods 220A-B as using computer code actions 225A-B, and that both actions require an additional computer code action program code 232 to be effective.

As discussed further below with FIG. 6, identified context 450 can be used to identify variations of computer code 460 and results of parameter identification, e.g., result parameter 470. In an example of the use, by one or more embodiments, of parameters with computer code actions in different contexts 450, a question of how to add a user with permissions to an operating system 448 can be analyzed. In an answer analyzed by one or more embodiments, a computer code action that adds a user, the adduser command, can be a solution indicated in an answer to the problem, e.g., included in question and answer repository 190 similar to the approach described above with question 205 and answer 210 discussed above.

In this example, with respect to parameters, an answer can specify, in the identified context of an alpha operating system, the solution can include a -NEW parameter, e.g., adduser -NEW, while in a beta operating system context, an effective operation of the command can include an -N parameter, e.g., adduser -N. One or more embodiments can identify the above-noted question, along with the computer code action and parameters provided as a solutions in different identified contexts, e.g., operating system 448. Once identified, one or more embodiments can combine this identified data with data from other analyzed questions and answers to identify additional parameters for the adduser computer code actions that can work in additional contexts, e.g., with different pre-conditions 442 and in different languages 455.

Figure 5:
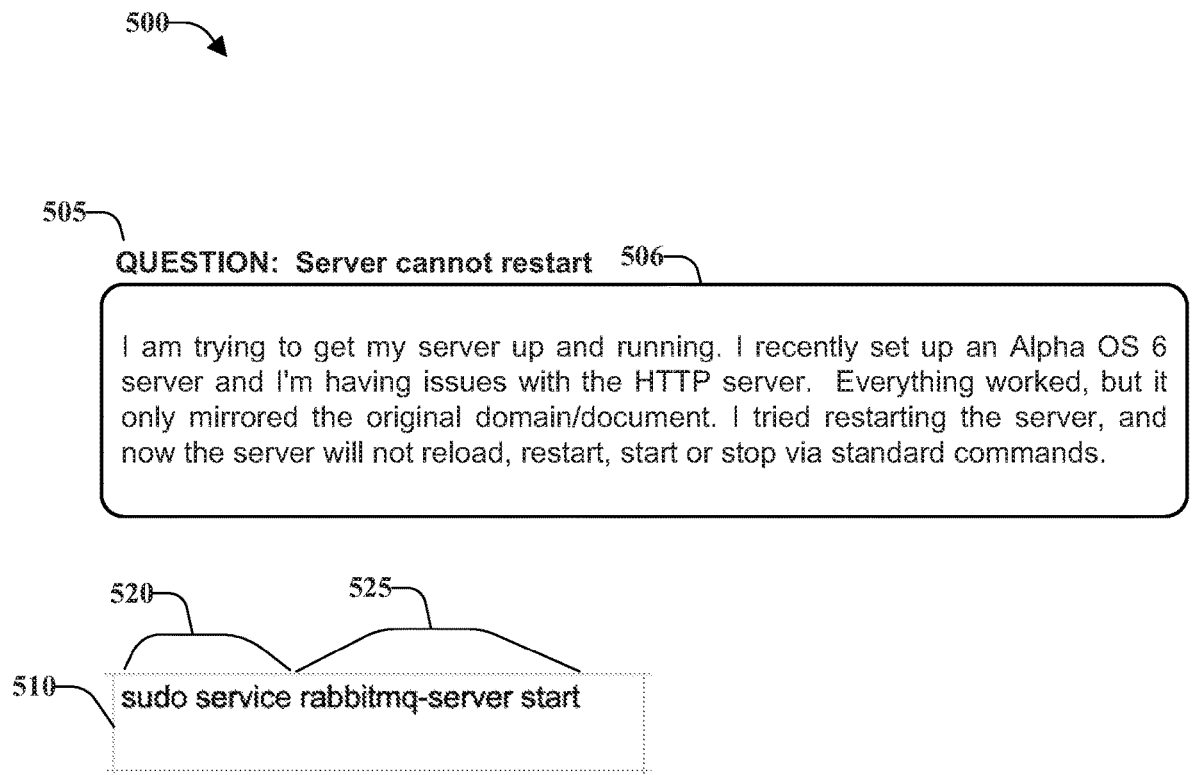
FIG. 5 illustrates an example where an answer having an identified computer code action with parameters is identified, then provided in response to a question, in accordance with one or more embodiments.

FIG. 5 illustrates an example where an answer 510, having an identified computer code action 520 with parameters 525 is identified, then provided in response to a question, in accordance with one or more embodiments. Repetitive description of like elements or processes employed in respective embodiments is omitted for sake of brevity.

In this example, answer 510 includes computer code action 520 with a parameter 525. In one or more embodiments, a question narrative 506 can be analyzed to identify different contexts for a question. For example, question 505 and the following portions of question narrative 506, can be indicative of different problems requiring solutions and different contexts. Question narrative 506 can indicate that the questioner is trying to get a type of specific server up and running. Thus, one or more embodiments can analyze question 505 and question narrative 506, and can identify a computer server context. Additionally, after analysis, question 505 can be identified as being in additional contexts, e.g., an HTTP server context and a virtual host context.

As noted above, in addition to the contexts discussed above, this type of question can also be in a context that is related to the types of computer code actions with which they relate, e.g., the above question can also be in a process management context and a domain setup context.

In addition to questions having a context, certain explanatory information from a document can describe the context in which the question is asked. For example, in question narrative 506, the questioner specifies that they recently set up a particular operating system and they are having issues with a HyperText Transfer Protocol (HTTP) server. As discussed further below, the setting up of the operating system is not only a context in which the HTTP server question is being asked, it is also a pre-condition to the problem, e.g., setting up the operating system is a task that is performed before the question activity about the HTTP server occurs. Other similar context and precondition statements in narrative 506 include that the user had a domain up and working and they tried adding domains via a virtual host setup, and all of the sites ran but they only mirrored the original domain/document. In this example, although the title of the question involves the inability to start a server, by the statements above, it appears that a problem setting up the virtual host can be causing the server start problem.

Considering this example, it is important to note that one or more embodiments can identify problems that are not explicitly stated in questions, e.g., question 505 relates to a server that cannot restart. Upon analysis by one or more embodiments, this problem can be discovered to be secondary to the problem with setting up virtual hosts identified above. The identification of contexts and problems described above are example results of operations described above. For example, syntactical analysis can identify the "I tried" portions of the question narrative 506 to identify attempted solutions, and sentiment analysis to assess the efficacy of attempted solutions as well as the results.

One or more embodiments can analyze the syntactical structure of elements of the documents, e.g., using sentence structures to identify components such as subjects, verbs, and objects of the elements. For example, question 205 states: "You can emulate pt-show-grants with the following [computer code action] [action parameters]." In this sentence, emulating grants can be identified as an action by identifying the subject then verb structure of the sentence, and following the identified action, the computer code action and parameters can also be identified by one or more embodiments.

In the example shown in FIG. 5, syntactical analysis by autoencoder 420 can be used to identify computer code action 520 and parameter 525 in answer 510. In this example, the syntax of the computer code action 520 can indicate that the sudo command is operating on a service, and parameter 525 can include a rabbitmq-server logical server name and start being a parameter directing the server to start. It should be noted that the commands and syntax discussed above are non-limiting examples of syntactical analysis that can be performed by one or more embodiments. A more detailed discussion of example machine learning approaches that can provide syntactical analysis similar to that noted above are discussed with the description of FIG. 8 below.

Syntactical analysis can be performed one or more embodiments by approaches that include analyzing the nomenclature used in different types of parameters using regular expressions and other pattern identification techniques. With reference to parameter results, these pattern analysis approaches can be used by one or more embodiments to identify specific types of parameters, e.g. flags used for certain operating system commands. To use this approach in system 150 discussed in FIG. 1 above, transforming component 159 can transform documents based on regular expressions. In an example, given the comment "You need to use a command-parameter to solve your problem" the following regular expression can identify only the computer code action "command" and the parameter "N" in the sentence:

.*?(command)( )(-)(N)

One having skill in the art, given the disclosure herein, would appreciate how regular expressions can be used by one or more embodiments to identify different elements, including parameters.

Alternatively or additionally, one or more embodiments can use a natural language parser to perform syntactical analysis on document elements to identify topics, contexts, computer code actions and parameters. As described with FIG. 8 below, one or more embodiments can use a machine learning techniques to parse documents and identify elements.

Figure 6:
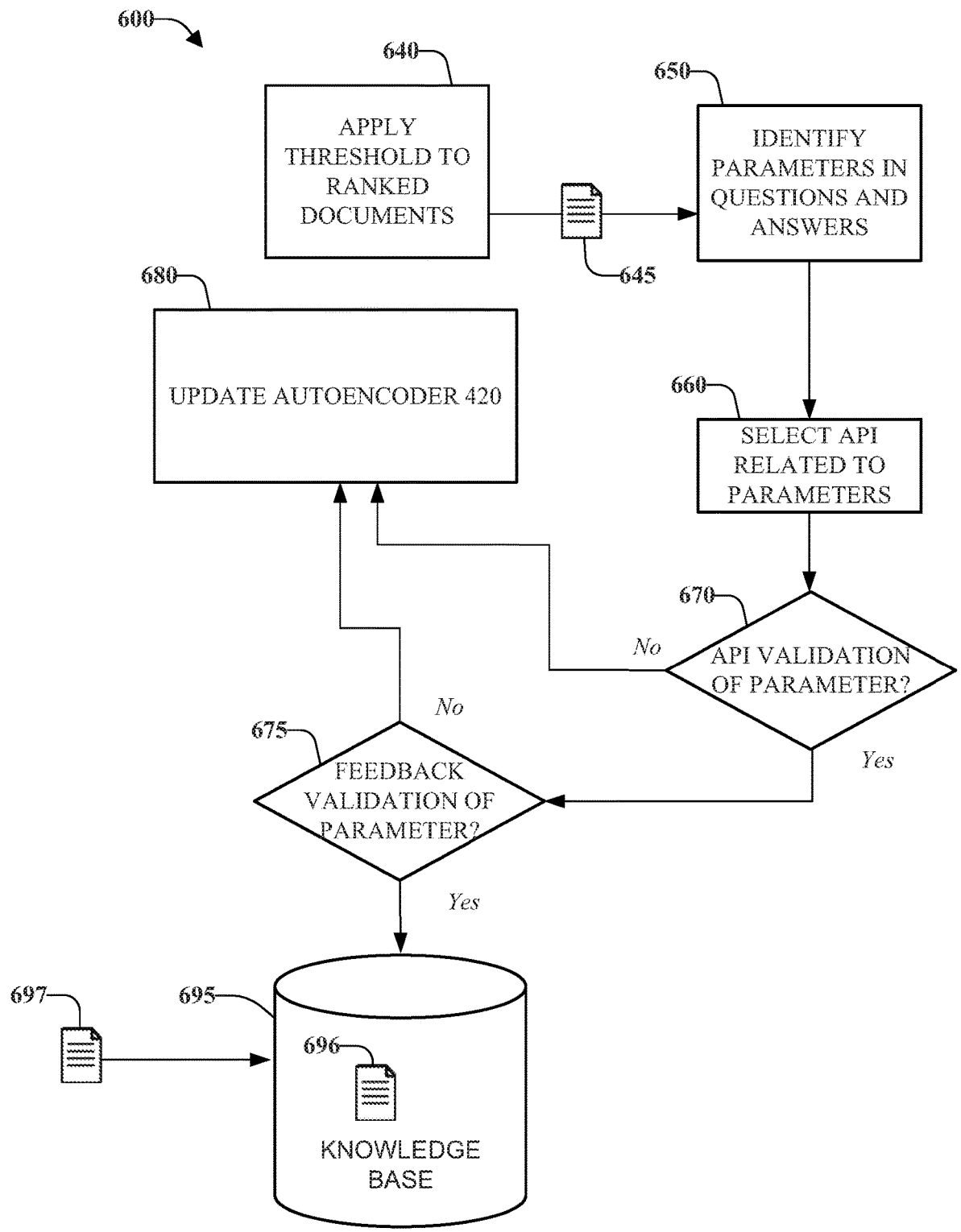
FIG. 6 illustrates a flow diagram of a system that can facilitate identifying and validating computer code actions and parameters in documents using documentation and feedback in accordance with one or more embodiments.

FIG. 6 illustrates a flow diagram of a system 600 that can facilitate identifying and validating computer code actions and computer code action parameters in documents, using documentation and feedback in accordance with one or more embodiments. Repetitive description of like elements or processes employed in respective embodiments is omitted for sake of brevity.

In one or more embodiments, at block 640, system 600 can receive the ranked documents discussed with FIG. 4 above and a threshold can be applied to the ranked documents, with documents exceeding the threshold being highly ranked document results 645 subject to further processing. In one or more embodiments, this application of a threshold can act to filter documents from later processing, for example, to reduce the likelihood that a less useful document will be used to generate knowledge base 695, as well as reducing the processing required by the system.

At block 650, document results 645 can be processed to identify parameters for computer code actions included in both questions and answers. In system 150 discussed above, for example, parameter component 154 can identify a result parameter in respective ones of one or more potential results analyzed by one or more embodiments.

To achieve the example parameter results discussed above, one or more embodiments can holistically analyze computer code actions and can discover parameters by analyzing the syntactical structure of the text and computer code snippets provided in answers. For example, as discussed above with FIG. 2, narrative explanation 224A-B and a computer code action 225A-B included in answer 210 can have a syntactical structure that can be used by one or more embodiments to identify parameters. Computer code action 225A can be analyzed, for example, by identifying the use of symbols including quotes, equal signs, dollar signs, parenthesis, hyphens, periods and greater than signs. Placement of these symbols, as well as associated values and commands, can facilitate the identification of the parameters of computer code action 225A by one or more embodiments.

Other approaches that can be used to analyze the syntactical representation of text and code snippets to discover parameters include using structured prediction techniques like type dependency, context free grammar, and adapter grammar Analysis of document elements and the identification of actions and parameters described herein, including syntactical analysis, can be performed, in one or more embodiments, by analysis component 158 depicted in FIG. 1 above.

At block 660, in one or more embodiments, identified computer code actions and parameters can be analyzed to select related application program interface (API) documentation, e.g., official reference manuals including descriptions of computer code actions, as well as related parameters and contexts of operation.

In one or more embodiments, API documentation can be searched for references to identified computer code actions and parameters. Once located in an API reference, the completeness of identified parameters can be supplemented by additional information from the documentation, e.g., additional parameters, information about different contexts, related commands, etc. In one or more embodiments, in addition to supplementing the information about a command code action with parameters, matching API documentation can be used to validate discovered parameters, e.g., check that spelling, syntax, function, and use across different contexts are correct.

At block 670, when the API validation described with block 660 determines that, for example, discovered parameters are not valid, this data can be used by block 680 as teaching data for machine learning aspects of autoencoder 420. For example, data corrected by API documentation can be used to update topics applied by one or more embodiments, e.g., invalid code portions of a discovered parameter can provide autoencoder with updated keywords and invalid descriptive aspects of a discovered parameter can be used to update, for example, a semantic index used for topic labeling, by one or more embodiments. This updating of autoencoder 420 based on training data from other system processes is described further with FIG. 8 below. In one or more embodiments, as discussed with FIG. 1 above, validating component 157 can perform the API validating functions discussed above to validate a parameter identified in a result.

At block 675, the results validated by API documentation in block 660 can have an additional validity assessment based on an analysis of feedback, e.g., feedback 320 in response to answer 210 of FIG. 2. As described above, feedback 320 can provide additional details in response to questions and answers, and can also be used to evaluate and recommend solutions stored, for example, in knowledge base 695.

Because feedback 320 can, in some cases, provide an independent evaluation of answer 210, one or more embodiments can use feedback 320 to validate the accuracy of data to be stored in knowledge base 195, e.g., verifying the accuracy of identified parameters for computer code actions. In one or more embodiments, validating component 157, noted above with block 670, can perform validating functions discussed above to validate a parameter identified in a result based on, for example, feedback 320 as described above.

In contrast to comment 240, in one or more embodiments, feedback 320 can come from a different source than answer 210, e.g., feedback 320 can provide an evaluation of answer 210 from an independent source, and thus potentially provide a more accurate assessment of answer 210. Additional types of feedback that can be analyzed by one or more embodiments can include votes by users in favor or not in favor of answer 210, e.g., favorable votes can be termed upvotes. In different systems, upvotes can be evaluated at block 675 as a part of feedback validation, of one or more embodiments.

When the validating based on feedback described above determines that, for example, discovered parameters are not valid based on deficiencies in user validation, this data can be used by block 680 as teaching data for machine learning aspect of autoencoder 420. For example, data identified by feedback as not being correct by one or more embodiments can be used as teaching data for machine learning approaches employed by autoencoder 420, e.g., used by block 680 to remove incorrect data from use in clustering, topic analysis, identification computer code actions and parameters, semantic index analysis, syntactical analysis of parameters, and other operations described above.

In one or more embodiments, the processed and validated questions and answers can be stored in knowledge base 695. In an example, information can be sought about how to answer a problem with the execution of a particular computer code action. One or more embodiments can use query 697 to retrieve information about the command from knowledge base 695. In this example, based on the analysis of question and answer resource described above, information about uses of the command are stored in knowledge base 695.

To retrieve results about the comment, in one or more embodiments, as discussed with FIG. 1 above, a query component can communicate query 697 to a result component 152. Result component 152 can select results 696 stored in knowledge base 695 based on a mapping of a query 697 to the one or more results stored in knowledge base 695, the mapping being based on the result parameter identified in the result and a criterion. In one or more embodiments, because results 696 are sought that are similar to query 697, the criterion applied is a degree of similarity, e.g., a high degree of similarity. In other embodiments, the criterion, as a degree of similarity, can be changed require a lower degree of similarity, e.g., to retrieve a broader collection of results based on the same query. In one or more embodiments, a different criterion can be used based on requirements for results. For example, using a criterion that is a degree of dissimilarity can provide useful results when mapping dissimilar documents is a goal, e.g., for research purposes.

Continuing this example, query 697 is about the command and is mapped to information and parameters for the command stored in knowledge base 695. Based on the criterion discussed above, when example query 697 is submitted, results 696 can be returned. One having skill in the relevant art, given the description herein, would appreciate that queries of data generated by the processed described above can broadly seek information about any individual or combination of elements described above, e.g., context, documentation, answers to questions about concepts, computer code actions, parameters adapted for different contexts, etc.

FIG. 7 illustrates sample topic 730A-B labels and identified results integrated into computer code with references to identified documentation, in accordance with one or more embodiments. Repetitive description of like elements or processes employed in respective embodiments is omitted for sake of brevity.

By using semantic indexes and other topic identification processes similar to those described above with FIG. 4, one or more embodiments can identify operating system alpha topic 730A and command A subtopic, e.g., computer code action 732A. During an API validation process, one or more embodiments can discover parameters 734A for command A subtopic computer code action 732A usable when operating in operating system alpha topic 730A. As depicted, a link for API documentation 735A is included as a validating reference. In one or more embodiments the above combination of data elements is a topic combination, e.g., computer code actions, parameters and API documentation. Example topics included in FIG. 7 further include topic application B 730B, combined with show grants computer code action 732B, parameters 734B, and API documentation 735B.

In this example, the data is formatted in JavaScript object notation data format (JSON) code. In one or more embodiments, the example JSON code can be used to add data to knowledge base 195. In alternative implementations, other data formats can also be used, e.g., extensible markup language (XML), delimited text files, or any other approach to representing structured data.

Figure 8:
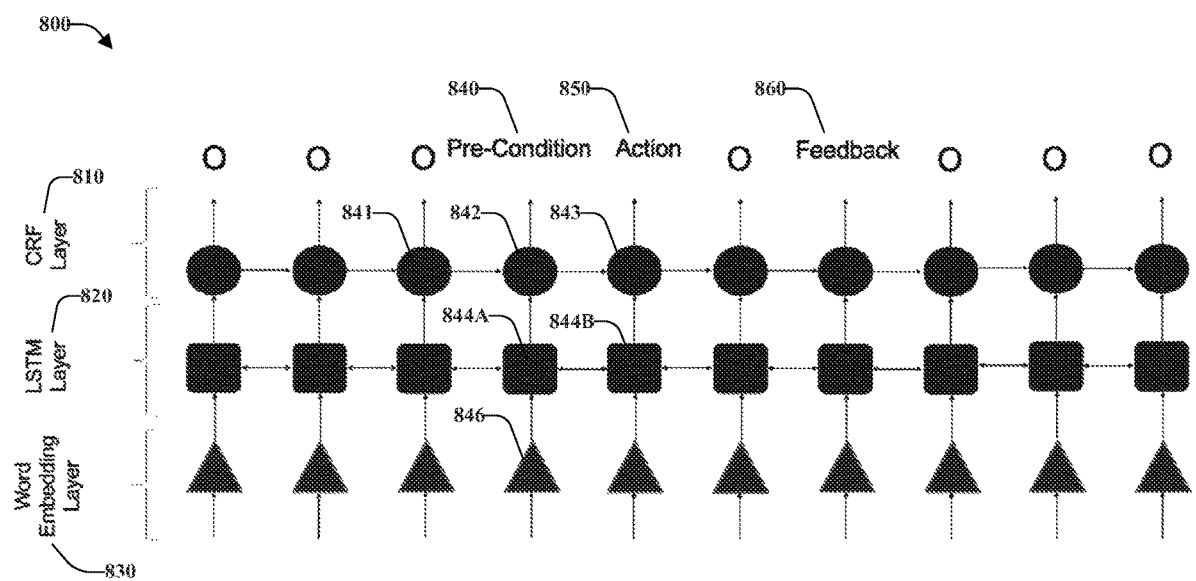
FIG. 8 illustrates a diagram illustrating machine learning operations of one or more embodiments.

FIG. 8 illustrates a diagram illustrating machine learning operations of one or more embodiments. Repetitive description of like elements or processes employed in respective embodiments is omitted for sake of brevity.

As noted above, one or more embodiments can use machine learning techniques to identify and label portions of documents analyzed by processes described herein. For example, contexts and topics described with FIG. 4, computer code actions and parameters described with FIG. 6, and answers and feedback described with FIGS. 2-3, are all examples of the types of elements that can be identified by the machine learning technique described herein. In one or more embodiments, an analysis component 158 can analyze results using an example approach depicted in FIG. 8, to determine a syntactical representation of pre-condition 840, action 850, and feedback 860 one or more results. Moreover, as described in FIG. 6 above, the identifying a result parameter 470 in respective ones of one or more results can be based on this syntactical representation.

FIG. 8 can be termed a long short-term memory neural network (LSTM) diagram, and it shows how natural language processing techniques can be used to identify words and concepts in the data repositories processed by operations above, e.g., question and answer repository 190.

In the example shown on FIG. 8, each column can represent a sentence in a string of sentences to be analyzed by one or more embodiments. In this example, different elements of a document are included, but three sections are targeted for identification. These sections are listed along with the topic labels applied by one or more embodiments: a pre-condition 840 to a solution being implemented, an action 850 to implement the solution, and feedback 860 that evaluates the action 850 as a solution.

In FIG. 8, word embedding layer 830 generally describes the intake and parsing of text to be analyzed in later steps, e.g., each triangle block represents a sentence in an analyzed data source. In this example, triangle 846 represents a sentence that can be identified by one or more embodiments as a pre-condition 840, e.g.: Before trying this solution, make sure you have admin privileges. As noted above, the use of terms like "before" can indicate that a pre-condition is present.

Because one or more embodiments can require the modeling of a sequence of labeled features, where past features can influence conclusions about current features, one or more embodiments can use a Long Short-Term Memory (LSTM) network, in the form of LSTM layer 820. LSTM networks, as used by one or more embodiments, are neural networks that can have loops in them, allowing some data to persist from one analysis to another.

When one or more embodiments use an LSTM neural network to process sequences of labeled features over time, this persistence of some data can be advantageous. For example, in FIG. 8, squares 844A-B are included in LSTM layer 820, and 844A can receive, for analysis, a portion of the document identified by triangle 846 in word embedding layer 830. For example, to determine whether square 844B is an action 850, a determination that can be indicative of an action can be the presence of a pre-condition 840 before the analyzed square 844B, e.g., in the example note above, a pre-condition 840 is determined to be at square 844A. Thus, as noted above, because in one or more embodiments, the presence of a pre-condition 840 makes an action 850 more likely to follow, LSTM layer 820 can select as a likely label for square 844B, an action label.

LSTM layer, as a neural network in one or more embodiments, can be optimized by training with different types of data. One type of data used to train the LSTM layer is data that is similar to data being analyzed, but with the results known. When the LSTM layer analyzes the data and determinations are made, the known results are used to train the LSTM by highlighting where the analysis of the neural network was wrong, and confirming where the analysis of the neural network was correct. One or more embodiments can use training data from different sources to provide similar training to the LSTM layer. One example source of training data is data from different embodiments that has been determined to be invalid and thus not for processing and storage.

As example of this training by invalid data is shown in FIG. 6, discussed above. Upon determining a no value at either API validation of a parameter at block 670 or feedback validation of a parameter at block 675, the data, along with, for example, information describing how the data was invalid, can be relayed to update autoencoder 420 block.

In one or more embodiments, after processing the sequence of content by LSTM layer 820, operation of one or more embodiments can proceed to conditional random fields (CRF) layer 810. CRF layer 810 can analyze neighbor blocks to assess the labels determined, and use label values to influence the selection of a topic label. For example, in circle 842, the determination by LSTM layer 820 discussed above, that a pre-condition 840 exists, is assessed by CRF layer 810 based on neighboring circle values, e.g., circle 841 and circle 843. In this example, because circle 843 is determined to be an action 850, CRF layer 810 can confirm the selection of precondition 840 for the value of circle 842. One or more can use approaches described above can also be used to identify elements of feedback 860 in analyzed content.

Figure 9:
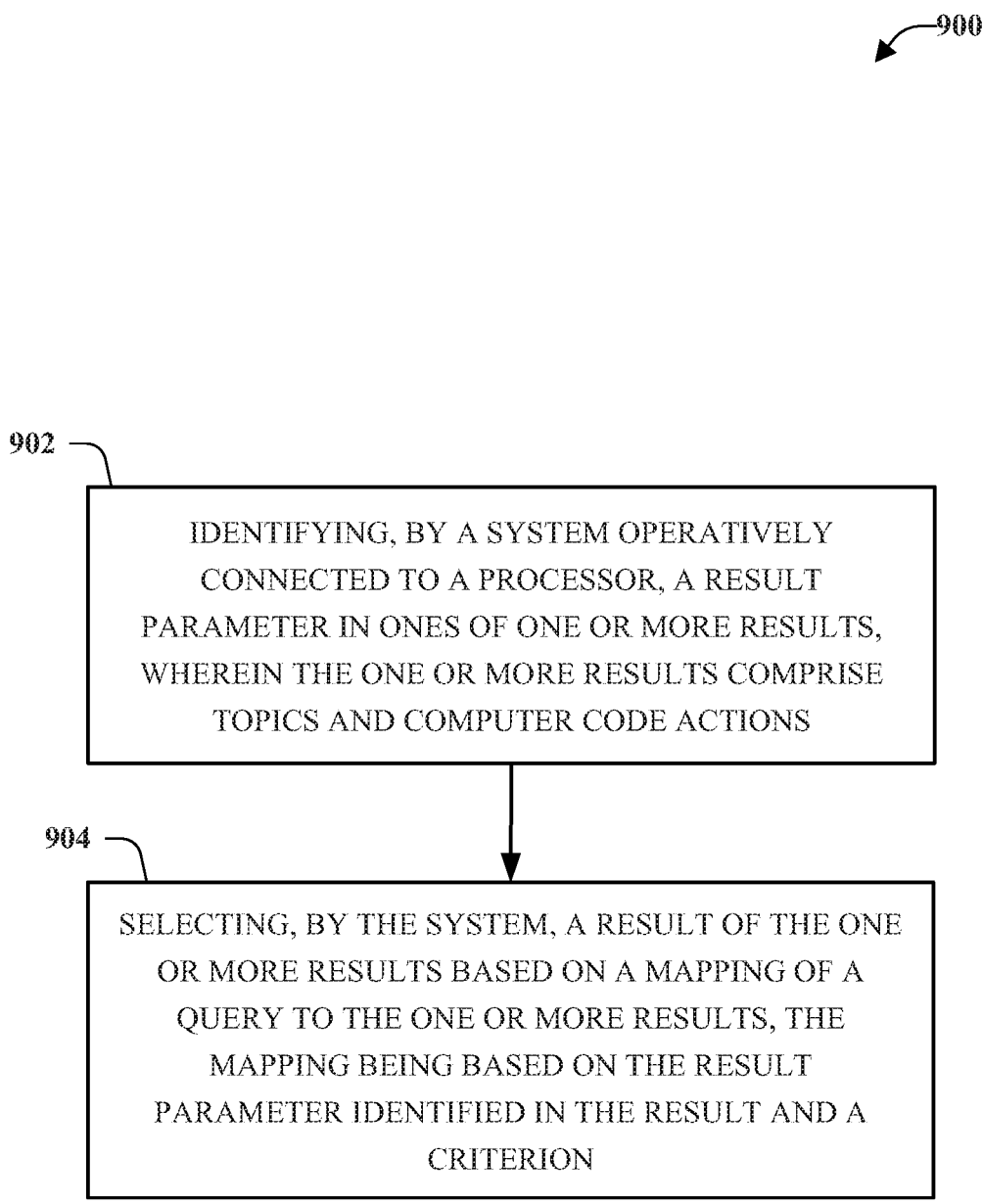
FIG. 9 illustrates a flow diagram of an example, non-limiting computer-implemented method that can facilitate creating and querying a knowledge base of identified topics, computer code actions, and parameters, in accordance with one or more embodiments described herein.

FIG. 9 illustrates a flow diagram of an example, non-limiting computer-implemented method that can facilitate creating and querying a knowledge base of identified topics, computer code actions, and parameters, in accordance with one or more embodiments described herein. Repetitive description of like elements or processes employed in respective embodiments is omitted for sake of brevity.

At 902, computer-implemented method 900 can include identifying, by a system 150 operatively connected to a processor 160, a result parameter 470 in respective ones of one or more results 645, wherein the one or more results 645 comprise topics 730A-B and computer code actions 732A-B. Considering 902 in the context of the components of FIG. 4, in one or more embodiments, computer-implemented method 900 can include identifying, by a system 150 operatively connected to a processor 160, a result parameter 470 based on, for example, employing analysis component 158 to analyze clustered and ranked documents, e.g., at block 430 to determine a syntactical representation of the topics and the computer code actions in the documents, resulting e.g., in computer code 460. Based on syntactical representation of the topics and the computer code 460 actions in the documents, result parameter 470 can be identified by one or more embodiments.

At 904, computer-implemented method 900 can include selecting, by the system 150, a result of the one or more results 696 based on a mapping of a query 697 to the one or more results, the mapping being based on the result parameter 470 identified in the results 696 and a criterion.

Figure 10:
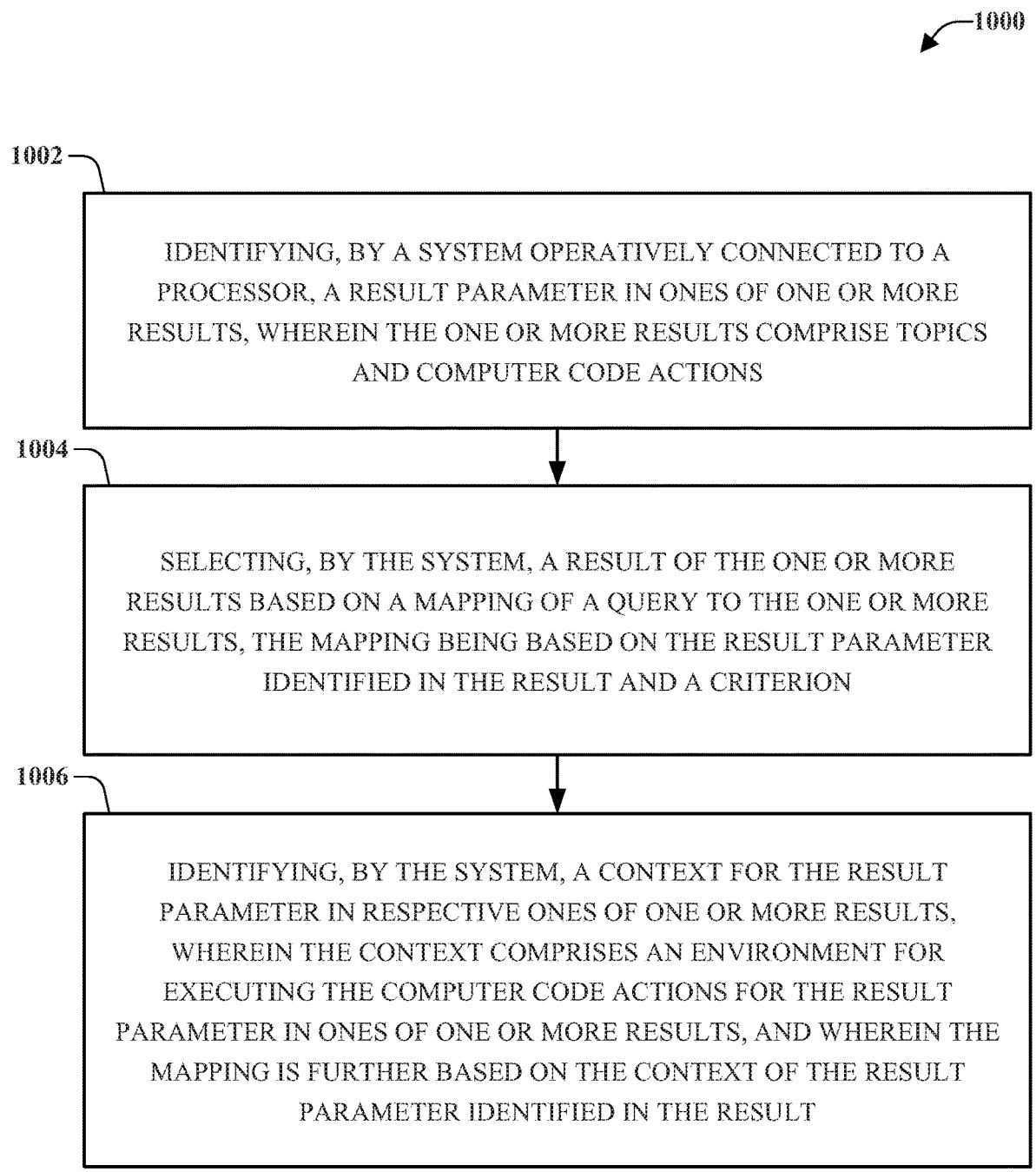
FIG. 10 illustrates a flow diagram of an example, non-limiting computer-implemented method that can facilitate creating and querying the knowledge base of FIG. 9 further based on identified contexts for query results in accordance with one or more embodiments described herein.

FIG. 10 illustrates a flow diagram of an example, non-limiting computer-implemented method that can facilitate creating and querying the knowledge base of FIG. 9 further based on identified contexts for query results in accordance with one or more embodiments described herein.

At 1002, computer-implemented method 1000 can include identifying, by a system 150 e.g., by parameter component 154, operatively connected to a processor 160, a result parameter 470 in respective ones of one or more results 645, wherein the one or more results 645 comprise topics 730A-B and computer code actions 732A-B.

At 1004, computer-implemented method 1000 can include selecting by the system, e.g., by query component 156, a result of the one or more results 696 based on a mapping of a query 697 to the one or more results, e.g., by the mapping being based on the result parameter 470 identified in the results 696 and a criterion.

At 1006, computer-implemented method 1000 can include identifying, by the system 150, e.g., by parameter component 154, a context 450 for the result parameter 470 in respective ones of one or more results 645, wherein the context 450 comprises an environment for executing the computer code actions 732A-B for the result parameter 470 in respective ones of one or more results 645, and wherein the mapping is further based on the context 450 of the result parameter 470 identified in the result. In an example, the mapping of the query 697 to the one or more results can be based on context 450, determined, for example, in block 440 of FIG. 4. In this example, both query 697 and the documents of knowledge base 695 can have identified contexts 450, and the mapping can use these contexts 450 to select results 696 based, for example, on a degree of similarity criterion, e.g., as performed in 1004 above.

Figure 11:
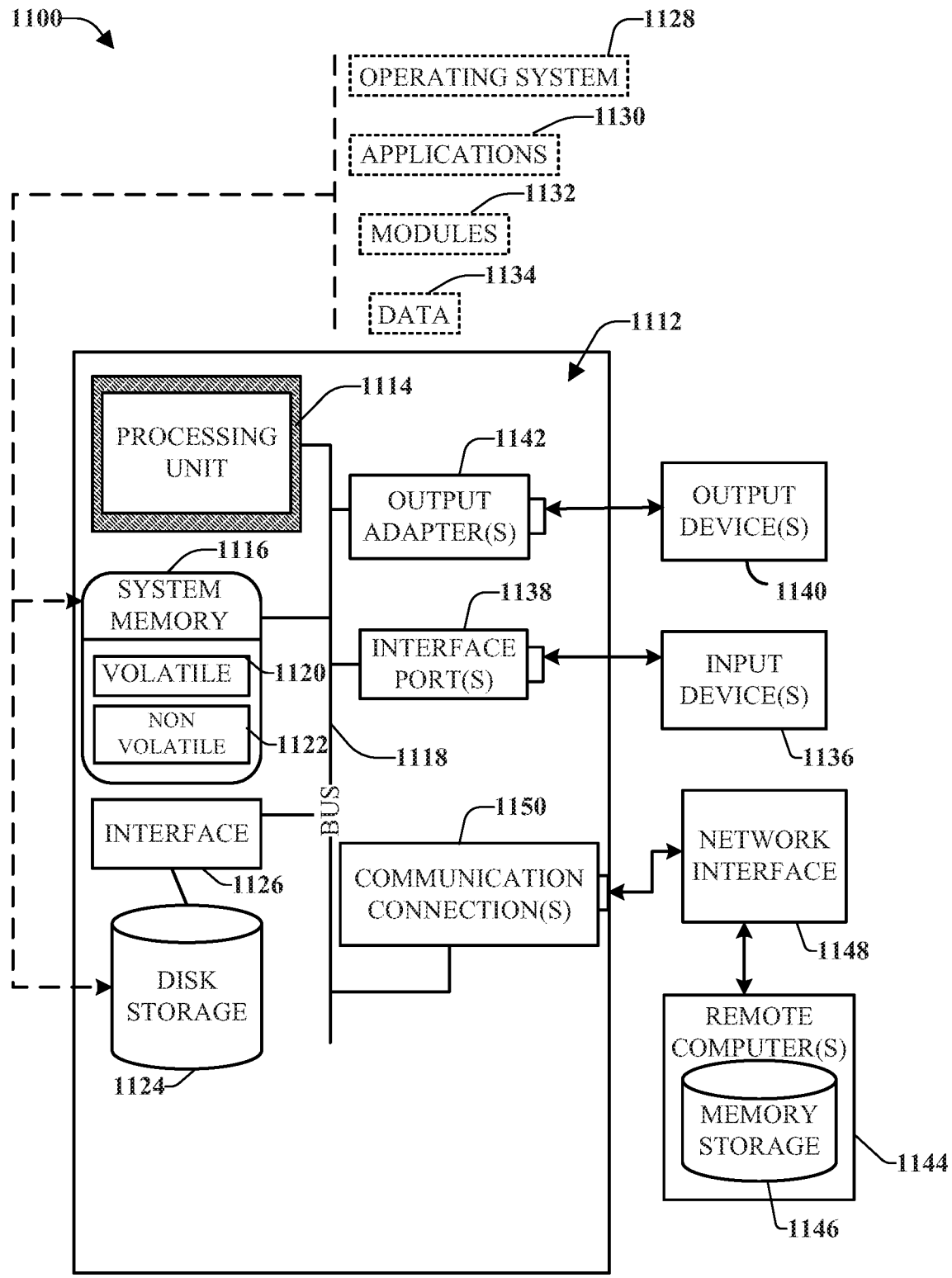
FIG. 11 illustrates a block diagram of an example, non-limiting operating environment in which one or more embodiments described herein can be facilitated.

FIG. 11 illustrates a block diagram of an example, non-limiting operating environment in which one or more embodiments described herein can be facilitated. In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements or processes employed in other embodiments described herein is omitted for sake of brevity.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The computer 1112 can include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide-area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions that implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer-implemented process, such that the instructions, which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an analysis component that:
selects documents that exceed a threshold rank from ranked documents in a question and answer repository, wherein the documents comprise questions related to computer-related tasks and answers to the questions,
parses, using a natural language processing technique, text of the questions and the answers in the documents to identify parameters and computer code actions in the text of the documents,
employs an autoencoder that:
applies topic labels to the questions and the answers based on the identified parameters and computer code actions,
maps the questions and answers to clusters based on the topic labels, and
generates a knowledge base based on the clusters of questions and answers;
a query component that receives a query associated with a computer-related task; and
a result component that:
performs a sentiment analysis on comments associated with the answers in the documents to determine respective efficacies of the computer code actions, and
selects a result from a cluster of the knowledge base based on the respective efficacies of the computer code actions and a mapping of the query to the result, the mapping being based on one or more parameters identified in the result and a criterion.

2. The system of claim 1, wherein the criterion comprises a degree of similarity between the query and the one or more parameters identified in the result.

3. The system of claim 1, wherein the result comprises at least one of a change ticket or a service ticket.

4. The system of claim 1, wherein the computer executable components further comprise a transforming component that transforms at least one of the query or the result, based on a regular expression.

5. The system of claim 1, wherein the one or more parameters are associated with the computer code actions.

6. The system of claim 1, further comprising a parameter component that identifies a context for the one or more parameters, wherein the context comprises an environment for executing the computer code actions for the one or more parameters, and wherein the mapping is further based on the context of the one or more parameters identified in the result.

7. The system of claim 6, wherein the context comprises at least one of, for the executing the computer code actions, a pre-condition, a post-condition, an application, or an operating system.

8. The system of claim 1, wherein the computer executable components further comprise a validating component that validates the one or more parameters identified in the result based on at least one of, feedback or source documentation, of the one or more parameters identified in the result.

9. The system of claim 1, wherein the mapping is further based on the topic labels.

10. A computer-implemented method, comprising:
selecting, by a system operatively connected to a processor, documents that exceed a threshold rank from ranked documents in a question and answer repository, wherein the documents comprise questions related to computer-related tasks and answers to the questions;
parsing, by the system, using a natural language processing technique, text of the questions and the answers in the documents to identify parameters and computer code actions in the text of the documents;
employing, by the system, an autoencoder that:
applies topic labels to the questions and the answers based on the identified parameters and computer code actions,
maps the questions and answers to clusters based on the topic labels, and
generates a knowledge base based on the clusters of questions and answers;
receiving, by the system, a query associated with a computer-related task;
determining, by the system, respective efficacies of the computer code actions in the results based on a sentiment analysis of comments associated with the answers in the documents; and
selecting, by the system, a result from a cluster of the knowledge base based on the respective efficacies of the computer code actions and a mapping of the query to the result, the mapping being based on one or more parameters identified in the result and a criterion.

11. The computer-implemented method of claim 10, wherein the criterion comprises a degree of similarity between the query and the one or more parameters identified in the result.

12. The computer-implemented method of claim 10, wherein the result comprise at least one of a change ticket or a service ticket.

13. The computer-implemented method of claim 10, further comprising, transforming, by the system, at least one of the query or the result, based on a regular expression.

14. The computer-implemented method of claim 10, wherein the one or more parameters are associated with the computer code actions.

15. The computer-implemented method of claim 10, further comprising, identifying, by the system, a context for the one or more parameters, wherein the context comprises an environment for executing the computer code actions for the one or more parameters, and wherein the mapping is further based on the context of the one or more parameters identified in the result.

16. The computer-implemented method of claim 15, wherein the context comprises at least one of, for the executing the computer code actions, a pre-condition, a post-condition, an application, or an operating system.

17. The computer-implemented method of claim 10, further comprising validating the one or more parameters identified in the result based on at least one of, feedback or source documentation, of the one or more parameters identified in the result.

18. The computer-implemented method of claim 10, wherein the mapping is further based on the topic labels.

19. A computer program product facilitating a selection of results, the computer program product comprising a computer readable storage medium having program instructions embodied therewith, the program instructions executable by a processor to cause the processor to:
 selecting documents that exceed a threshold rank from ranked documents in a question and answer repository, wherein the documents comprise questions related to computer-related tasks and answers to the questions;
 parsing using a natural language processing technique, text of the questions and the answers in the documents to identify parameters and computer code actions in the text of the documents;
 employing an autoencoder that:
  applies topic labels to the questions and the answers based on the identified parameters and computer code actions,
  maps the questions and answers to clusters based on the topic labels, and
  generates a knowledge base based on the clusters of questions and answers;
 receiving a query associated with a computer-related task;
 determine respective efficacies of the computer code actions in the results based on a sentiment analysis of comments associated with the answers in the documents; and
 select a result from a cluster of the knowledge base based on the respective efficacies of the computer code actions and a mapping of the query to the result, the mapping being based on one or more parameters identified in the result and a criterion.

20. A computer program product of claim 19, wherein the criterion comprises a degree of similarity between the query and the one or more parameters identified in the result.

\* \* \* \* \*